United States Patent
Kuenen

(10) Patent No.: US 6,510,809 B2
(45) Date of Patent: Jan. 28, 2003

(54) INSTALLATION FOR COATING PRODUCTS WITH A PULVERULENT MATERIAL

(75) Inventor: Hendrikus Antonius Jacobus Kuenen, Overloon (NL)

(73) Assignee: Koppens B.V., Bakel (NL)

( * ) Notice: Subject to any disclaimer, the term of this patent is extended or adjusted under 35 U.S.C. 154(b) by 29 days.

(21) Appl. No.: 09/725,464

(22) Filed: Nov. 30, 2000

(65) Prior Publication Data

US 2001/0003260 A1 Jun. 14, 2001

(30) Foreign Application Priority Data

Dec. 8, 1999 (NL) .............................................. 1013797

(51) Int. Cl.[7] .......................... B05C 19/04; A21C 9/04; A23G 3/00
(52) U.S. Cl. .............................. 118/13; 118/23; 118/24; 118/308
(58) Field of Search ........................... 118/13, 22, 501, 118/23, 24, 308; 426/289; 99/494

(56) References Cited

U.S. PATENT DOCUMENTS 3,759,218 A * 9/1973 Korstvedt ..................... 118/22
4,333,415 A * 6/1982 Miller et al. ................... 118/24
4,497,244 A    2/1985 Koppens
5,238,493 A    8/1993 Miller
5,951,760 A * 9/1999 Kuenen ......................... 118/13

FOREIGN PATENT DOCUMENTS

EP          0 397 267       11/1990

* cited by examiner

Primary Examiner—Richard Crispino
Assistant Examiner—Yewebdar T Tadesse
(74) Attorney, Agent, or Firm—Young & Thompson

(57) ABSTRACT

The installation includes an endless conveyor belt which allows pulverulent material to pass through and has a top part and a bottom part, an element for forming a layer of pulverulent material on a portion of the top part on which products can be accommodated and can be moved in the direction of transport, as well as a device for applying a layer of pulverulent material on the products present on the top part, which device includes a container having a discharge for the pulverulent material, as well as a distributor which allows the pulverulent material to pass through, for uniformly distributing the pulverulent material over the width of the top part. The distributor includes a distribution element that is located transversely below the discharge and allows the pulverulent material to pass through, as well as a part, such as a plate, located below the distribution element, that does not allow the pulverulent material to pass through.

10 Claims, 4 Drawing Sheets

US 6,510,809 B2

INSTALLATION FOR COATING PRODUCTS WITH A PULVERULENT MATERIAL

FIELD OF THE INVENTION

The invention relates to an installation for coating food products with a fine pulverulent material, such as flour or breadcrumbs, comprising an endless conveyor belt which allows the pulverulent material to pass through and has a top part and a bottom part, means for forming a layer of pulverulent material on a portion of the top part on which the products can be accommodated and can be moved in the direction of transport, as well as means for applying a layer of pulverulent material on the products present on the top part, which means comprise a container having a discharge for the pulverulent material, as well as distribution means which allow the pulverulent material to pass through, for uniformly distributing the pulverulent material over the width of the top part.

BACKGROUND OF THE INVENTION

An installation of this type is disclosed in U.S. Pat. No. 5,238,493. The pulverulent material is fed to the distribution means in a more or less thick layer, and at a certain speed, from a hopper located above the conveyor belt. Problems arise especially when feeding a relatively thin layer of pulverulent material at low speed, as is required in order to coat the products with relatively little pulverulent material. Under these conditions lumps of the pulverulent material form, which lumps drop onto the distribution means.

The known distribution means are found not to be readily capable of distributing the locally higher concentrations of pulverulent material issuing therefrom uniformly over the entire width of the conveyor belt. The quantity (volume) of pulverulent material dispensed is, moreover, not continuous over time. The result of this is that some products on the belt receive too much pulverulent material and other products too little.

SUMMARY OF THE INVENTION

The aim of the invention is to provide an installation of the type described above which does not have these disadvantages and makes better, more uniform distribution of the pulverulent material possible. Said aim is achieved in that the distribution means comprise a distribution element that is located transversely below the discharge and allows the pulverulent material to pass through, as well as a part, such as a plate, located below the distribution element, that does not allow the pulverulent material to pass through.

The pulverulent material that issues from the container does not fall directly through the distribution element onto the products but is initially impeded by the plate underneath. Because any lumps now first impinge on the plate, these are broken up. The pulverulent material can then not only be dispensed such that it is uniformly distributed but also continuously over time. With this arrangement the plate acts as a buffer.

To promote uniform dispensing, the distribution element and the plate can be oriented at a slight angle of inclination, sloping downwards towards the top part. The pulverulent material can slide off over the distribution element and the plate in a controlled manner, by which means the result can be further improved.

Preferably, the lowest, downward-sloping edge of the distribution element extends beyond the plate, such that the pulverulent material is able to drop through the distribution element beyond the plate. The distribution element is brought into back-and-forth vibration or a shaking movement transversely to the top part of the conveyor belt.

The distribution element can be constructed in various ways, for example as a sieve. However, the preference is for a circulating, endless shaking belt which runs around the plate, such that the plate is below the top part of the distribution belt.

Should some lumps still nevertheless remain, it must be possible for these to be removed in a reliable manner without their being able to get onto or between the products. To this end, a transverse guide can be present close to the lowest end of the distribution element, for removing lumps of pulverulent material to the side.

With this arrangement the residual pulverulent material can be dispensed because there is a passage between the transverse guide and the lowest edge of the plate, through which the pulverulent material is able to fall.

Preferably, the transverse guide is oriented sloping towards a discharge end for removal of the lumps. Furthermore, the transverse guide can be profiled on that side thereof which faces the plate, the profiling being asymmetric in such a way that the lumps are forced towards the discharge end under the influence of the shaking movement.

BRIEF DESCRIPTION OF THE DRAWINGS

The invention will now be explained with reference to an illustrative embodiment shown in the figures.

DETAILED DESCRIPTION OF THE INVENTION

Figure 1:
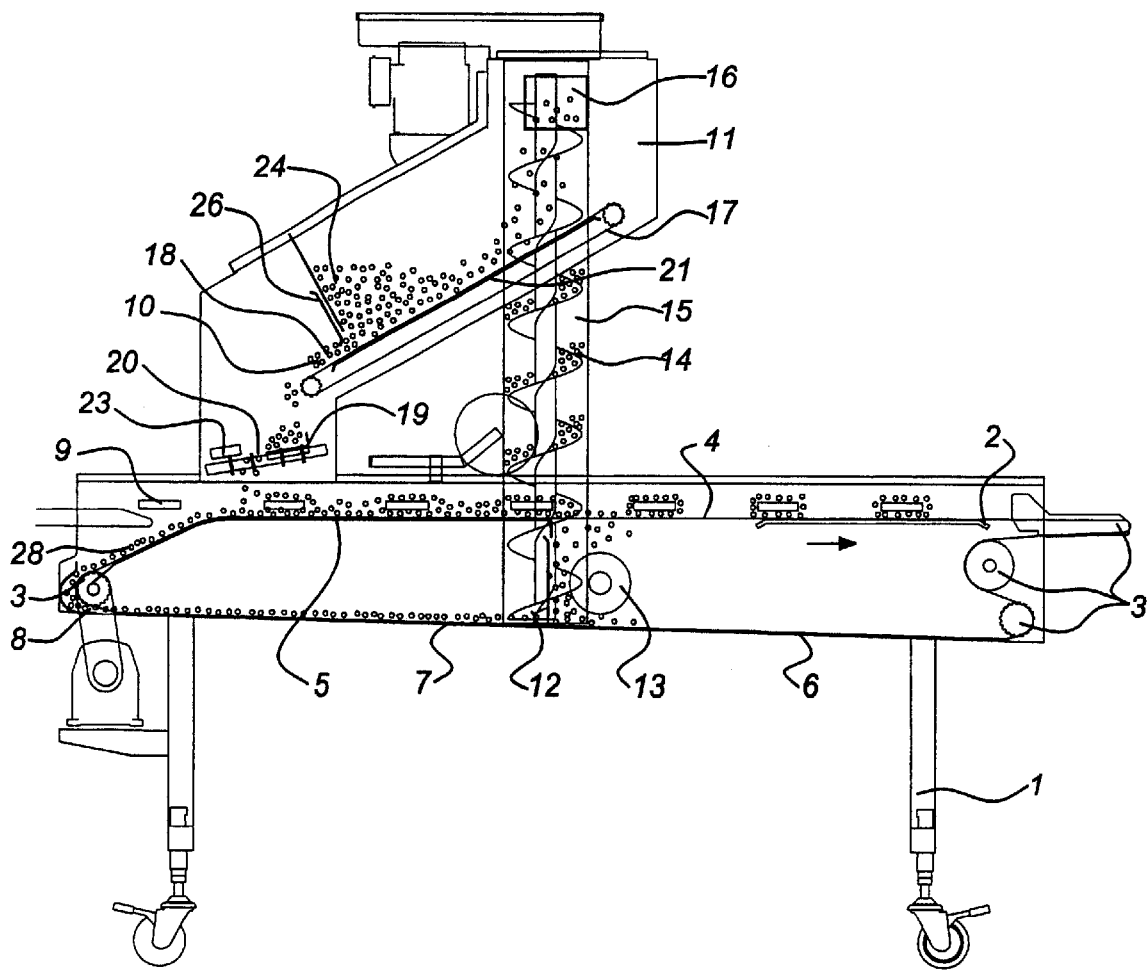
FIG. 1 shows a sectional side view of the installation.

The installation shown in FIG. 1 for coating food products with a material such as flour or breadcrumbs 24 comprises a frame 1 over which a conveyor belt, made of wire material 2 that allows said flour to pass through, is guided round over rollers 3, as well as a hopper 11 in which a stock of material 24 is present. The conveyor belt 2 has a top part 4, beneath which a top guide plate 5 extends. The conveyor belt 2 also has a bottom part 6, beneath which a bottom guide plate 7 extends. The direction of revolution of the conveyor belt 2 is to the right in FIG. 1, as indicated by arrows.

At that end of the conveyor belt 2 that is on the left in FIG. 1 the bottom guide plate 7 merges into a deflector plate 8, which runs in a curve around the roller 3 concerned. The flour 24 supported on the bottom guide plate 7 is carried along by the conveyor belt 2 and via the deflector plate 8 is fed to the right over the top guide plate 5.

The food products 9 are transported onto the layer 28 of material that has already formed on the left-hand section of the top guide plate 5. The food products 9 originate from a further conveyor belt, which is not shown. The products 9 then reach a point below the discharge 10 of the hopper 11, from where a further quantity of flour is applied to the top of the food products.

Figure 2:
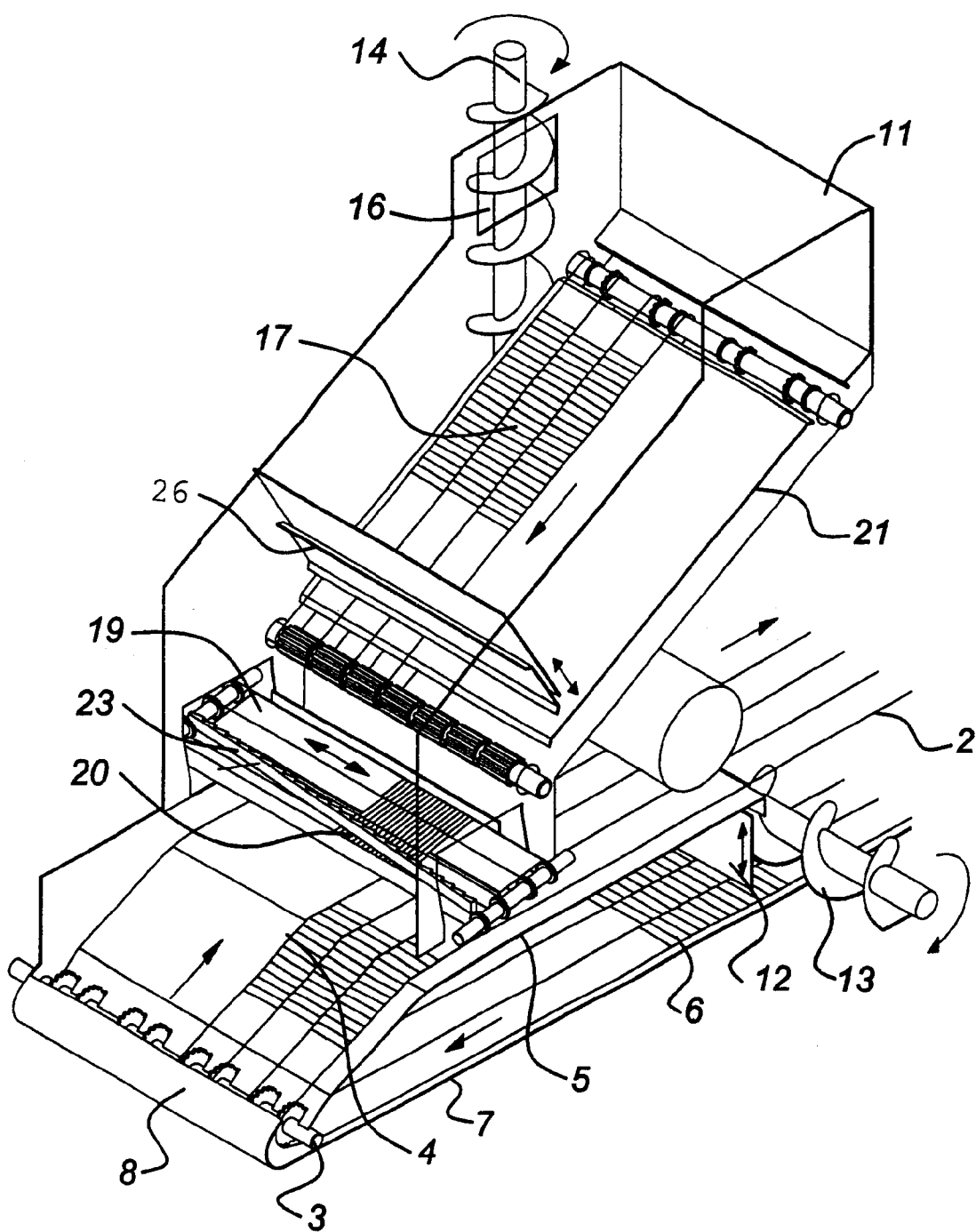
FIG. 2 shows a perspective of part of the installation.

As the top part 4 of the conveyor belt 2 moves further to the right the products 9, which are now completely coated, are removed and the flour 24 drops through the conveyor belt 2. A plate 12 is positioned between the top part 4 and the bottom part 6 of the conveyor belt. The flour 24 that has dropped through the conveyor belt 2 is retained by plate 12, as a result of which a buffer is produced. Some of this buffer is transported via a first screw conveyor 13, as shown in FIG. 2, to a second screw conveyor 14. An opening between plate 12 and bottom guide plate 7 determines the bottom layer thickness. A quantity of flour 24 is carried along by the conveyor belt 2 to the deflector plate 8.

As shown in FIG. 1, the flour 24 passes via the first screw conveyor 13 into a tube 15 in which the second screw conveyor 14 is located. The material is pumped up by means of this screw conveyor 14 to an opening 16 in the top section of the hopper 11, such that the material can then again be applied to the top of the products 9. A conveyor belt 17 in the hopper 11 transports the flour 24 to the outflow opening 18 of the hopper 11; a guide plate 21 is located below conveyor belt 17.

The thickness of the layer of material that is fed from the hopper 11 onto the conveyor belt 17 can be adjusted by means of the gate 26. The quantity is, furthermore, of course affected by the running speed of the conveyor belt 17.

Figure 3:
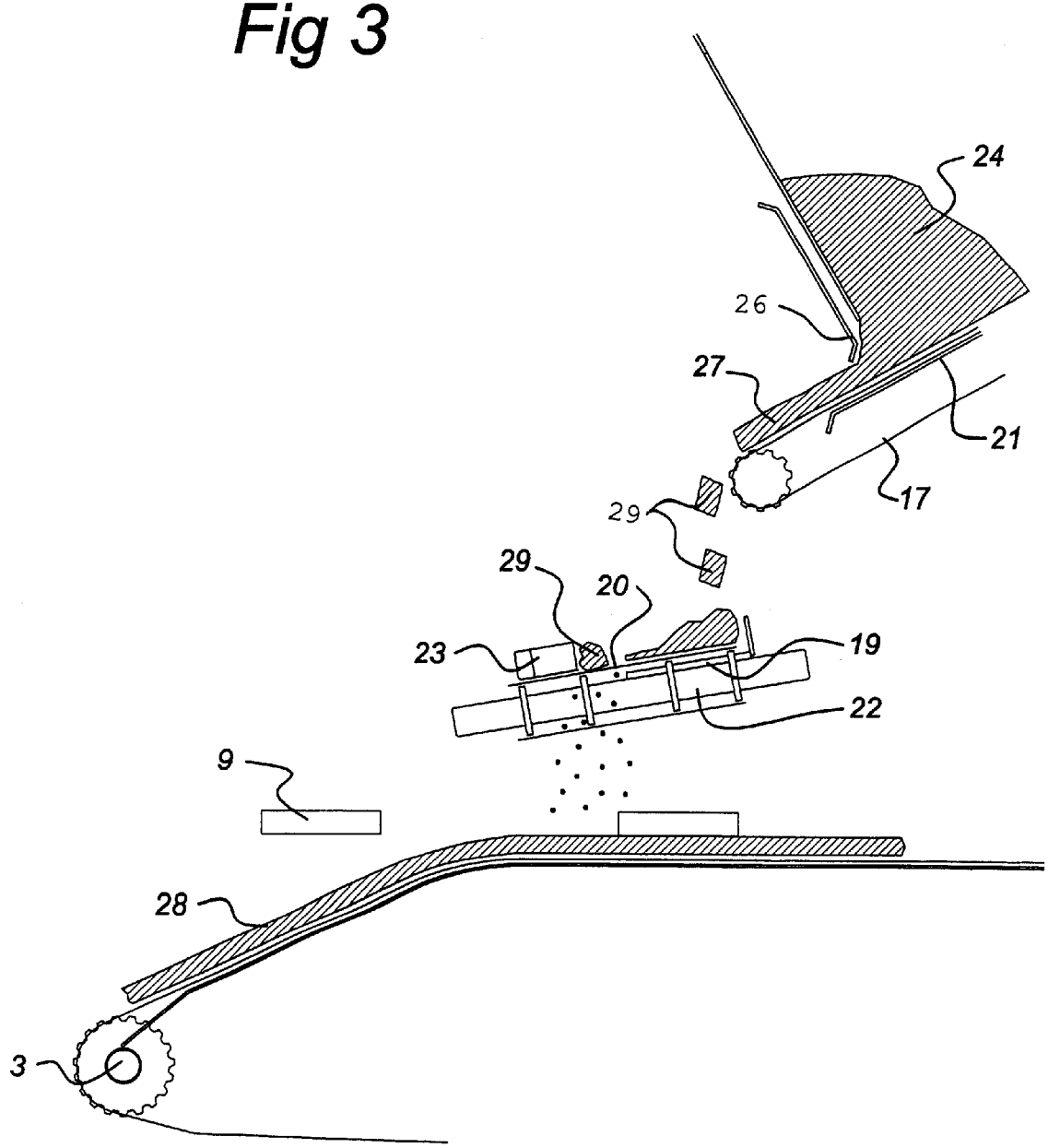
FIG. 3 shows a side view on a larger scale.
Figure 4:
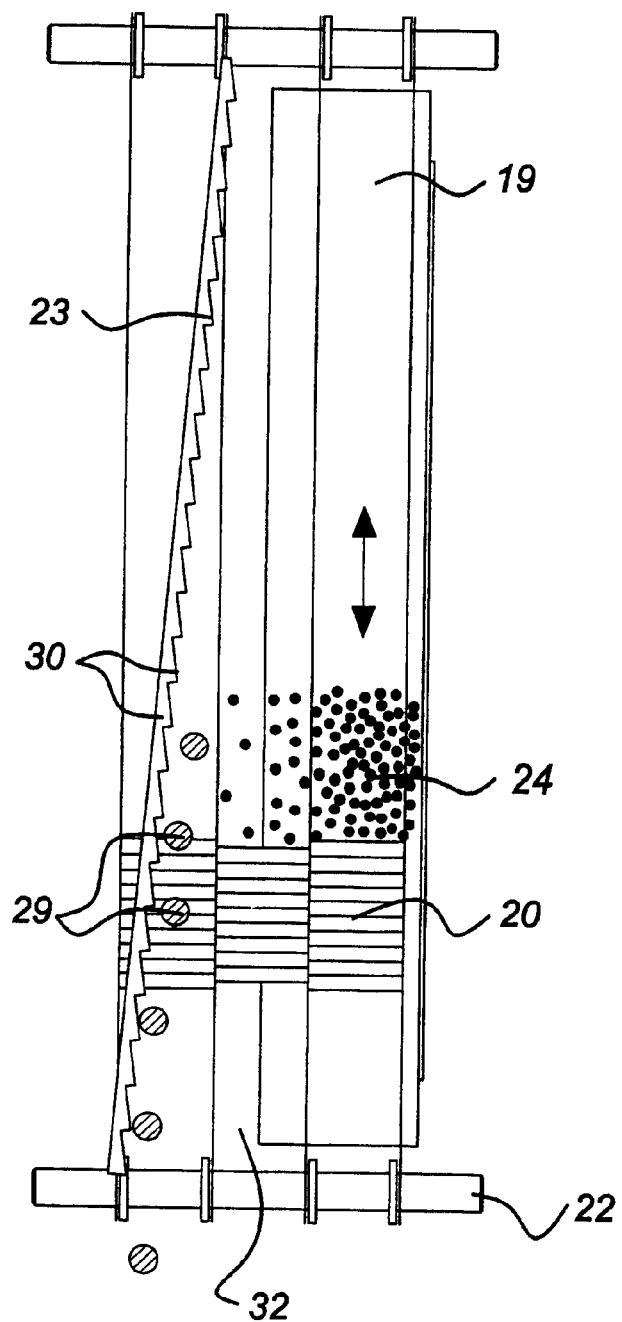
FIG. 4 shows a plan view on a larger scale.

As is clearly shown in FIGS. 1 and 2, and in the enlarged detail in FIG. 3, the layer 27 can run off the belt 17 in such a way that lumps 29 form. These lumps of pulverulent material, together with the fine material, pass on to the continuous, endless shaking belt 20 which is guided around the shafts 22. This shaking belt 20 does not circulate but moves back and forth with respect to a neutral position. Since the shaking belt 20 is positioned at an angle, the pulverulent material slides downwards over the plate 19, after which it drops down via the passage 32 between the transverse guide 23 and the lowest edge of the plate 19 through the shaking belt 20 onto the products 9, which are already on a bottom layer of pulverulent material 28.

Any lumps 29 which nevertheless still remain are not able to drop through the conveyor belt 20 and move further downwards until they come into contact with the transverse guide 23. This transverse guide has asymmetric profiling 30. Moreover, it is positioned sloping slightly in the direction of the discharge end of the shaking belt 20.

Partly as a consequence of its sloping position and the asymmetric serrations 30, the remaining lumps of material 29 are reliably removed over the shaking belt 20 to the discharge end by the shaking movements of the shaking belt 20.

What is claimed is:

1. An installation for coating food products with a fine pulverulent material, the installation comprising:
    an endless conveyor belt which allows the pulverulent material to pass through and has a top part and a bottom part;
    means for forming a layer of pulverulent material on a portion of the top part on which the products can be accommodated and can be moved in a direction of transport; and
    means for applying a layer of pulverulent material on the products present on the top part, which means comprise a container having a discharge for the pulverulent material and distribution means which allow the pulverulent material to pass through, for uniformly distributing the pulverulent material over the width of the top part,
    wherein the distribution means comprise a distribution element located transversely below the discharge and allows the pulverulent material to pass through and a plate, located below the distribution element, that does not allow the pulverulent material to pass through.

2. The installation according to claim 1, wherein the distribution element and the plate are oriented at a slight angle of inclination, sloping downwards towards the top part.

3. The installation according to claim 2, wherein the lowest, downward-sloping edge of the distribution element extends beyond the plate, such that the pulverulent material is able to drop through the distribution element beyond the plate.

4. The installation according to claim 2, wherein the distribution element is movable in a back-and-forth shaking movement or vibration transversely to the top part of the conveyor belt.

5. The installation according to claim 4, wherein the distribution element comprises a continuous, endless shaking belt and runs around the plate such that that part that does not allow material to pass through is located below the top part of the shaking belt.

6. The installation according to claim 3, further comprising a transverse guide present close to the lowest end of the distribution element, for removing lumps of pulverulent material to the side.

7. The installation according to claim 6, further comprising a passage between the transverse guide and the lowest edge of the plate, through which the pulverulent material is able to fall.

8. The installation according to claim 6, wherein the transverse guide is oriented sloping towards at least one discharge end for removal of the lumps.

9. The installation according to claim 8, wherein the transverse guide is profiled on that side thereof that faces the plate.

10. The installation according to claim 9, wherein the profiling is asymmetric in such a way that the lumps are forced towards the discharge end under the influence of the back-and-forth shaking movement and/or vibrations.

* * * * *